United States Patent

Nodelman et al.

Patent Number: 6,005,016
Date of Patent: Dec. 21, 1999

[54] RIGID POLYURETHANE FOAM BASED ON POLYETHERS OF TDA

[75] Inventors: Neil H. Nodelman, Upper St. Clair; David D. Steppan, Gibsonia; John W. Jenny, Pittsburgh, all of Pa.; Peter Gansen, Leverkusen, Germany

[73] Assignee: Bayer Corporation, Pittsburgh, Pa.

[21] Appl. No.: 09/166,977

[22] Filed: Oct. 6, 1998

[51] Int. Cl.$^6$ .................................................. C08G 18/32
[52] U.S. Cl. .......................... 521/164; 521/167; 521/112; 521/129; 521/174
[58] Field of Search .................................. 521/164, 167, 521/174, 129, 112

[56] References Cited

U.S. PATENT DOCUMENTS

| | | | |
|---|---|---|---|
| 4,116,893 | 9/1978 | Flanagan | 521/137 |
| 4,190,712 | 2/1980 | Flanagan | 521/137 |
| 4,212,954 | 7/1980 | Nomura et al. | 521/159 |
| 4,282,330 | 8/1981 | Austin | 521/118 |
| 4,371,629 | 2/1983 | Austin | 521/115 |
| 4,614,754 | 9/1986 | Christman | 521/167 |
| 4,866,102 | 9/1989 | Pray et al. | 521/137 |
| 4,981,880 | 1/1991 | Lehmann et al. | 521/174 |
| 5,167,884 | 12/1992 | Rossio et al. | 264/45.5 |
| 5,187,204 | 2/1993 | Jackson et al. | 521/111 |
| 5,216,041 | 6/1993 | Rossio et al. | 521/137 |
| 5,232,957 | 8/1993 | Pritchard et al. | 521/174 |
| 5,489,618 | 2/1996 | Gerkin | 521/128 |

*Primary Examiner*—Rachel Gorr
*Attorney, Agent, or Firm*—Joseph C. Gil; Noland J. Cheung

[57] ABSTRACT

The present invention is directed to a rigid, molded foam produced by reacting: a) one or more organic polyisocyanates, with b) a polyol blend comprising i) 100 parts by weight of a mixture comprising: 1) from 30 to 80 parts by weight of one or more polyethers having hydroxy functionalities of 2 or 3 and molecular weights of from about 1,000 to about 8,000, the polyethers further being characterized as containing no nitrogen atoms and not being filled polyethers, 2) from 10 to 50 parts by weight of one or more adducts of toluene diamine and an alkylene oxide, the adduct having a molecular weight of from about 350 to about 700, 3) from 0 to 15 parts by weight of one or more di- or trialkanol amines, with the amounts of components 1), 2) and 3) totaling 100 parts, and c) from about 0.1 to about 4 parts by weight per 100 parts by weight of component b) of a silicone cell-opening surfactant and d) from 1 to 7 parts by weight of water, and e) from 0.1 to 2 parts by weight of at least one tertiary amine catalyst; wherein the reaction mixture contains no auxiliary blowing agents and wherein the amount of polyisocyanate is such that the isocyanate index is from 95 to 120.

12 Claims, No Drawings

RIGID POLYURETHANE FOAM BASED ON POLYETHERS OF TDA

BACKGROUND OF THE INVENTION

Energy absorbing foams based upon urethane chemistry are known in the art. The early literature generally utilized halocarbon blowing agents (see, e.g., U.S. Pat. No. 3,926,866). A significant number of patents have issued relating to water blown energy absorbing foams based upon polyols ("filled polyols") prepared by polymerizing styrene/acrylonitrile monomer mixtures in polyethers (see, e.g., U.S. Pat. Nos. 4,116,893, 4,190,712, 4,212,954, 4,866,102, 5,216,041 and 5,232,957). Other patented technology describes the use of relatively low molecular weight crosslinkers (see, e.g., U.S. Pat. Nos. 4,282,330, 5,143,941, and 5,167,884) or the use of various polyols, such as ethylene oxide adducts of Mannich condensates (U.S. Pat. No. 4,371,629), alkoxylated toluene diamine (U.S. Pat. No. 4,614,754), or polyols derived from propylene glycol or ethylene diamine (U.S. Pat. No. 5,187,204). Other patented technology describes the water blown energy absorbing foams as a flexible foam (U.S. Pat. Nos. 4,981,880 and 5,489,618).

While systems based upon some of the patents noted above have been used commercially, the search continues for systems which will produce energy absorbing foams having a reduced cost, which will meet a variety of specifications such as meeting commercial production processing requirements of at most, a five (5) minute demold time. "Demold time" is defined as the time from the start of the introduction of the foamable reactants into the mold until the finished part is removed from the mold.

SUMMARY OF THE INVENTION

The present invention is directed to a rigid, molded foam produced by reacting: a) one or more organic polyisocyanates, with b) a polyol blend comprising i) 100 parts by weight of a mixture comprising: 1) from 30 to 80 parts by weight of one or more polyethers having hydroxy functionalities of 2 or 3 and molecular weights of from about 1,000 to about 8,000, the polyethers further being characterized as containing no nitrogen atoms and not being filled polyethers, 2) from 10 to 50 parts by weight of one or more adducts of toluene diamine and an alkylene oxide, the adduct having a molecular weight of from about 350 to about 700, 3) from 0 to 15 parts by weight of one or more di- or trialkanol amines, with the amounts of components 1), 2) and 3) totaling 100 parts, and c) from about 0.1 to about 4 parts by weight per 100 parts by weight of component b) of a silicone cell-opening surfactant and d) from 1 to 7 parts by weight of water, and e) from 0.1 to 2 parts by weight of at least one tertiary amine catalyst; wherein the reaction mixture contains no auxiliary blowing agents and wherein the amount of polyisocyanate is such that the isocyanate index is from 95 to 120.

An object of the present invention is to develop a novel polyol mixture which allows for the production of energy absorbing foams which meet the specification of having no less than a five (5) minute demold time.

A further object of the present invention is to not require the use of expensive filled polyols while still allowing for the production of foams displaying very low molding pressures with good moldability.

DETAILED DESCRIPTION OF THE INVENTION

The foams of the present invention are water blown, energy absorbing rigid molded foams broadly produced by reacting a specified isocyanate reactive mixture with a polymethylene poly(phenyl isocyanate).

The isocyanate reactive mixture A) comprises the following specific components: 1) at least one polyether polyol having a hydroxyl functionality of from 2 to 3 and a molecular weight ranging from 1,000 to 8,000, the polyether further characterized as containing no nitrogen atoms and not being filled polyethers; 2) one or more adducts of toluene diamine and an alkylene oxide, the adduct having a molecular weight of from 350 to about 700 and 3) one or more di- or trialkanol amines, B) a cell opening surfactant and C) water in the amount ranging from about 1 to about 7 percent by weight.

The polyetherpolyols used in component A) and their methods of manufacture are generally known in the art. Examples of some suitable polyethers for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerine, ethylene glycol, triethanolamine, water, trimethylolpropane, bisphenol A, sucrose, aniline, ammonia, ethanolamine and ethylene diamine. Mixtures of these starters are also advantageously used to prepare polyethers with the desired functionality of 2 to 3 for component A)1) of the present invention. It is preferred to use polyethers which contain substantial amounts of primary hydroxyl groups in terminal positions (greater than 80% by weight, based on all of the terminal hydroxyl groups present in the polyether).

Polyether polyols consisting of copolymers of propylene oxide and ethylene oxide are preferably used as component A)1) in the invention.

Suitable amine-initiated polyether polyols include adducts of toluene diamine. These amine initiated polyether polyols and the processes for their production are known and described in, for example, U.S. Pat. Nos. 4,877,879 and 5,786,405, and Japanese Abstracts 57168917A and 5716918. These polyether polyols show promising results in foam-forming systems blown without CFC blowing agents. Such polyether polyols can be formed by reacting an amine such as, for example, toluene diamine, with an alkylene oxide such as, for example, ethylene oxide or propylene oxide. This reaction may also be catalyzed with an alkaline catalyst such as potassium hydroxide.

Suitable ethanolamine derivatives and N-substituted ethanolamines to be used as component A)3) according to the invention include, for example, ethanolamine, N-methylethanolamine, diethanolamine, and triethanolamine. Preferred ethanolamine derivatives include, for example, diethanolamine and triethanolamine. The methods of manufacture of these derivatives are generally known in the art.

The polymethylene poly(phenyl isocyanates) useful herein are known in the art and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. The isocyanates useful herein contain from about 40 to about 85% by weight of methylene bis(phenyl isocyanate) and have an isocyanate group content of from about 20 to about 35% by weight, preferably from about 30 to about 35% by weight, and most preferably from about 31 to about 33% by weight. As noted above, the isocyanate index of the total system is from about 95 to about 120.

When water is used as the sole blowing agent, it is typically used in the present invention in quantities of between about 1 to about 7 percent by weight, and preferably from about 2 to 5.5 percent by weight based on 100% by weight of the isocyanate reactive mixture.

The silicone cell-opening surfactants, which are used in amounts of from about 0.1 to about 4 percent by weight are known in the art. In a preferred embodiment, the silicone cell-opening surfactants are used in an amount of about 0.3 to about 2.5 percent by weight. Polyether siloxanes are particularly suitable silicone cell-opening surfactants. These compounds are generally copolymers having a polydimethyl siloxane group attached chains of polyethylene oxide and polypropylene oxide, or mixed blocks of the two. Examples of useful cell-opening silicone surfactants include those sold as L3802 and L3801 formerly named as UAX 6164 and 6137, respectively, commercially available from Witco. Other examples of useful cell-opening silicone surfactants include L3803 from Witco and also those cell-opening silicone surfactants disclosed in U.S. Pat. No. 5,489,618. The surfactants used in the present invention are higher in molecular weight than the standard commercially available surfactants having a molecular weight ranging from about 15,000 to about 90,000.

The reaction mixture also contains at least one tertiary amine catalyst for catalyzing the reaction between isocyanate groups and hydroxyl groups. The tertiary amine is present in an amount ranging from about 0.05 to about 2 percent by weight and preferably, from 0.1 to 1 percent by weight. The urethane catalysts are generally known and include tertiary amines such as triethylamine, tributylamine, N-methylmorpholine, N-ethyl-morpholine, N-cocomorpholine, N,N,N',N"-tetramethyl-ethylene-diamine, 1,4-diaza-bicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylenetriamine, N,N-dimethyl-cyclohexylamine, N,N,N',N'-tetramethyl-1,3-butanediamine, N,N-dimethyl-β-phenylethylamine, 1,2-dimethyl-imidazole, 2-methylimidazole and the like. Also useful are the commercially available tertiary amines such as Niax AI and Niax AI07, available from Witco; Thancat DD, available from Huntsman; and the like. Mannich bases known per se obtained from secondary amines such as dimethylamine and aldehydes, preferably formaldehyde, or ketones such as acetone, methyl ethyl ketone or cyclohexanone and phenols such as phenol, nonylphenol or bisphenol may also be used as catalysts. Silaamines having carbon-silicon bonds as described, e.g., in German Patent No. 1,229,290 and U.S. Pat. No. 3,620,984 may also be used as catalysts. Delayed action catalysts such as acid blocked tertiary amines commercially available as NIAX A-300, NIAX A-400, NIAX-107, DABCO 8154, DABCO DC-1, and DABCO DC-2 may also be used. Formic acid, 2-ethylhexanoic acid, and glycolic acid are typical of the carboxylic acids used to block these amines.

Other suitable catalysts may include, for example, organometallic catalysts. Some examples of suitable organometallic catalysts include, for example, organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercapto-acetate), and di(isooctyl)tin bis(isooctyl-mercapto-acetate), all of which are commercially available from Witco Chemical Corp., are especially preferred. The use of a delayed action catalyst such as an iron pentanedione or a bismuth carboxylate, as described in U.S. Pat. No. 4,611,044, herein incorporated by reference, is also possible.

The reaction mixture may also optionally contain additives such as trimerization catalysts. Trimerization catalysts (i.e., catalysts which promote the self-polymerization reaction of isocyanate groups) are known in the art.

Finally, according to the present invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Höchtlen, Carl-Hanser-Verlag, Munich, 1966, pages 121 and 205.

The foaming reaction for producing foam products is carried out inside molds. In this process, the foamable reaction mixture is introduced into a mold which may be made of a metal such as aluminum or a plastics material such as an epoxy resin. The reaction mixture foams up inside the mold to produce the shaped product. The process of foaming in molds is carried out to produce a product having a non-cellular structure (skin) on its surface.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften Nos. 2,121,670 and 2,307,589.

The invention is further illustrated but is not intended to be limited by the following examples in which all parts and percentages are by weight unless otherwise specified.

EXAMPLES

In the examples which follow, the following materials were used:
A) POLYOL A: A poly (oxyalkylene) polyol having a molecular weight of about 4000 and a functionality of about 2, and prepared by adding a mixture of about 87% propylene oxide and 13% ethylene oxide to propylene glycol such that about 75% of the hydroxyl groups are primary.
B) POLYOL B: A poly (oxyalkylene) polyol having a molecular weight of about 4,800 and a functionality of about 3, and prepared by adding a mixture of about 83% propylene oxide and 17% ethylene oxide to glycerine such that about 85% of the hydroxyl groups are primary.
C) POLYOL C: An ortho-TDA based polyether containing both ethylene oxide and propylene oxide units having a hydroxyl number of 395.

D) POLYOL D: A PHD polyol based on POLYOL B with a solids content of 20% and a hydroxyl number of 28.
E) POLYOL E: An ethylene diamine initiated-propylene oxide polyether polyol having an average hydroxyl functionality of 4 and a hydroxyl number of 630.
F) TEOA: triethanolamine (An adduct of ammonia and 3 moles of ethylene oxide).
G) DEOA: diethanolamine (Adduct of ammonia and 2 moles of ethylene oxide).
H) Dabco DC-1: An acid blocked triethylenediamine (TEDA) catalyst available from Air Products.
I) Glycerin.
J) Dytek A: An amine (2-Methylpentamethylenediamine) available from DuPont.
K) B4690: A silicone surfactant from Goldschmidt.
L) UAX 6137: A cell opening silicone surfactant commercially available from Witco (also known as L3801).
M) UAX 6164: A cell opening silicone surfactant commercially available from Witco (also known as L3802).
N) DC-5244: A cell opening silicone surfactant commercially available from Air Products.
O) NIAX A1: a tertiary amine catalyst (70% solution of bis(dimethyl-aminoethyl) ether) available from Witco.
P) WATER.
Q) ISO: a polymethylene poly(phenyl isocyanate) containing about 45% by weight diisocyanate, having an isocyanate group content of about 31.5%, an equivalent weight of about 133, and a viscosity of about 200 mPa·s at 25° C., commercially available from Bayer Corporation.

A foam machine, used to make the foamed blocks, was equipped with two REXROTH 12 axial piston pumps and a Hennecke mQ-8 mixhead. The parts were made in an open-pour process in a 10"×10"×2.5" heated aluminum mold. The injection pressure was 150 bar on the polyol and isocyanate side. The throughput in the mixhead was maintained at 100 g/sec.

The polyol blend was made in the proportions indicated and put into the RIM machine and heated, along with the isocyanate, to a temperature betweeen 29° C. and 32° C.

TABLE 1

| | FORMULATIONS | | | | | |
|---|---|---|---|---|---|---|
| | 1 | 2 | 3 | 4 | 5 | 6 |
| Polyol A 9182 | 30 | 30 | 30 | 30 | 30 | 30 |
| Polyol B 9143 | | 24 | 24 | 24 | 24 | 24 |
| Polyol C 9166 | | 23 | 23 | 26 | 26 | 23 |
| Polyol D 9151 | 30 | | | | | |
| Polyol E 4050 | 25 | | | | | |
| TEOA | | 8 | 8 | | | 8 |
| DEOA | | | | 4 | 4 | |
| Glycerin | | | | 1 | 1 | |
| DYTEK A | 0.1 | | | | | |
| Water | 3.1 | 3.1 | 3.1 | 3.1 | 3.1 | 3.1 |
| B-4690 | 1 | 1 | | 1 | | |
| UAX 6164 | | | 1 | | 1 | |
| UAX 6137 | | | | | | 1 |
| DC-5244 | | | | | | |
| NIAX A1 | 0.1 | 0.2 | 0.2 | 0.2 | 0.2 | 0.2 |
| Dabco DC-1 | | 0.2 | 0.2 | 0.2 | 0.2 | 0.2 |
| Ratio(B Side: ISO) | 100:97 | 100:113 | 100:113 | 100:110 | 100:110 | 100:110 |
| PROCESSING | | | | | | |
| Index | 100 | 110 | 110 | 105 | 105 | 107 |

TABLE 1-continued

| | FORMULATIONS | | | | | |
|---|---|---|---|---|---|---|
| | 1 | 2 | 3 | 4 | 5 | 6 |
| Demold time (min.) | 5 | 5 | 5 | 5 | 5 | 5 |
| SLED IMPACT Cylindrical Head (6") 43 lb. TUP 17 MPH | | | | | | |
| Max force, lbs. | 5310 | 4850 | 4830 | 5000 | 5060 | 4907 |
| Maximum deflection in. | 1.98 | 1.95 | 1.90 | 1.89 | 2.00 | 1.83 |
| Efficiency, % | 84 | 75 | 89 | 83 | 72 | 77 |
| Physical Prop. CLD 50% (fullblock) (psi) | 44.1 | .50 | 46.6 | 46.1 | 47.2 | 42.3 |
| Density pcf) | 4.1 | 3.8 | 4.2 | 3.8 | 4.1 | 4.4 |
| % Open cell | 46 | 62 | 97 | 55 | 96 | 95 |

TABLE 2

| | A | B | C | D |
|---|---|---|---|---|
| E-9151 | 30 | | | |
| E-9143 | | 24 | 24 | 24 |
| E-9182 | 30 | 30 | 30 | 30 |
| E-9166 | | 23 | 23 | 23 |
| M-4050 | 25 | | | |
| TEOA | | 8 | 8 | 8 |
| DYTEK A | 0.1 | | | |
| H₂O | 3 | 3.1 | 3.1 | 3.1 |
| B-4690 | 1 | | | |
| L-3801 | | 1 | | |
| DC 5244 | | | 0.6 | 0.6 |
| A-1 | 0.1 | 0.2 | 0.2 | 0.2 |
| DC-1 | | 0.2 | 0.2 | 0.2 |
| DC-5043 | | | | 1.0 |
| B-Side:ISO | 100:97 | 100:115 | 100:115 | 100:115 |
| String gel time (sec) | 23 | 24 | 19 | 24 |
| Tack free time (sec) | 39 | 50 | 58 | 55 |
| Cream time (sec) | 4 | 6 | 6 | 6 |
| Top of cup time (sec) | 15 | 18 | 25 | 18 |
| Comments | Fine cells/slight post expansion | Fine cells/no post expansion | Coarse cells/no post expansion | Fine cells/post expansion |

Example A which is the same as Example 1 is the control and is outside the scope of our patent. It is based on a more expensive filled polyether and a crosslinker based on the more expensive starter, ethylene diamine (compared with ortho-TDA). Note that molded form blocks are slightly post-expanded.

Examples C and D, based on DC-5244, a conventional cell-opening surfactant is also outside the scope of the patent. Example C, which is based solely on DC-5244 shows no post-expansion but produces instabilities and is very coarse celled. In Example D, a known cell stabilizer, DC-5043, is added to DC-5244. This time, fine cells are produced but post-expansion is observed. Example B of the present invention, based on the very high molecular weight silicone, is fine-celled and is formed with no post-expansion.

Examples 3, 5, and 6 are illustrative of our claims. The open-cell content of these three foams are very high (≧95%). The others based on B-4690, known as a very weak stabilizer, have open-cell contents at about 50%, and show slight post-expansion.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid, molded foam produced by reacting:
a) one or more organic polyisocyanates, with
b) a polyol blend comprising
   i) 100 parts by weight of a mixture comprising:
      1) from 30 to 80 parts by weight of one or more polyethers having hydroxy functionalities of 2 or 3 and molecular weights of from about 1,000 to about 8,000, said polyethers further being characterized as containing no nitrogen atoms and not being filled polyethers,
      2) from 10 to 50 parts by weight of one or more adducts of toluene diamine and an alkylene oxide, said adduct having a molecular weight of from about 350 to about 700,
      3) from 0 to 15 parts by weight of one or more di- or trialkanol amines, with the amounts of components 1), 2) and 3) totaling 100 parts, and
c) from about 0.1 to about 4 parts by weight per 100 parts by weight of component b) of a silicone cell-opening surfactant;
d) from 1 to 7 parts by weight per 100 parts of component b) of water;
e) from 0.1 to 2 parts by weight per 100 parts of component b) of at least one tertiary amine catalyst;
wherein the reaction mixture contains no auxiliary blowing agents and
wherein the amount of polyisocyanate is such that the isocyanate index is from 95 to 120.

2. A rigid, molded foam according to claim 1 wherein said one or more organic polyisocyantes comprises methylene poly(phenyl isocyanate) containing from about 40 to about 85% by weight of methylene bis(phenyl isocyanate) and having an isocyanate group content of from about 20 to about 35% by weight, with the amount of said isocyanate being such that the isocyanate index of the mixture of all the isocyanate reactive components and said isocyanate is from about 95 to about 120.

3. The foam according to claim 1, wherein said amine is selected from the group consisting of ethanolamine, N-methyl-ethanolamine, diethanolamine and triethanolamine.

4. The foam of claim 3, wherein said amine is triethanolamine.

5. The foam of claim 1, wherein the isocyanate group content of said polyisocyanate is from about 30 to about 35% by weight.

6. The foam of claim 5, wherein said isocyanate group content of said polyisocyanate is from about 31 to about 33% by weight.

7. The foam of claim 1, wherein said water ranges from about 2 to about 5.5 percent by weight.

8. The foam of claim 1, wherein said silicone cell-opening surfactant is from about 0.3 to about 2.5 parts by weight per 100 parts by weight of said polyol blend.

9. The foam of claim 8, wherein said silicone cell-opening surfactant comprises a polyether siloxane.

10. The foam of claim 9, wherein said silicone cell-opening surfactant has a molecular weight ranging from 15,000 to 90,000.

11. The foam of claim 1, wherein said foam comprises at least one trimerization catalyst ranging from about 3 to about 10 parts by weight of said polyol blend.

12. The foam of claim 1, wherein said tertiary amine catalyst ranges from about 0.1 to about 1 part by weight of said polyol blend.

* * * * *